3,416,933
STABLE WAX EMULSIONS CONTAINING HEXAVALENT CHROMIUM

James Nicholson and Donald Poole, Pontefract, England, assignors to Hickson's Timber Impregnation Co. (G.B.) Limited, Castleford, Yorkshire, England, a British company
No Drawing. Filed Feb. 14, 1966, Ser. No. 527,073
Claims priority, application Great Britain, Feb. 22, 1965, 7,565/65
10 Claims. (Cl. 106—15)

ABSTRACT OF THE DISCLOSURE

There are provided wood treating compositions in emulsion form containing a hydrophobic wax, a wood preservative, particularly one based on hexavalent chromium, and a nonionic surface active agent having at least one condensed ethylene oxide chain containing at least 25 ethylene oxide units and a Hydrophilic Lipophilic Balance number between 12 and 22, the surface active agent preferably being a condensate of a long chain fatty alcohol or an alkyl phenol.

---

This invention relates to novel water-borne wood-treatment compositions having a wood-preservative and/or fire retardant action.

In the treatment of wood to impart fire-retardancy or resistance to fungal or insect attack, one useful method is to impregnate the wood under pressure with a waterborne wood preservative and/or fire-retardant. Among the most effective preservative compositions are those of the copper-chrome-arsenate type, which are generally employed at solution strengths of between 1 and 5% and at a pH between 1.8 and 3.0. After treatment, reducing substances in the wood convert the hexavalent chromium to the trivalent state resulting in a rise in pH and precipitation of an insoluble copper-chrome-arsenate complex within the wood.

The more effective fire-retardant compositions are usually based on ammonium salts, for example, ammonium phosphate or sulphate, and/or borax, and are commonly used at relatively high solution strengths, for example in the range 10–20% w./v. Such fire-retardant compositions may, however, effloresce or be washed out by prolonged exposure to water and are normally only intended for interior use.

However, while the above compositions have been found to be effective, they lack the property possessed by the conventional tar-oil preservatives of imparting a degree of water-repellency to the wood. Water-repellency improves the weather resistance of the wood and, in particular, by inhibiting swelling due to absorption of water and shrinkage during drying, maintains its dimensional stability. Water-repellents have only a slight effect on the rate of absorption of water-vapour in timber and have little effect on the equilibrium moisture-content of the wood but they are normally effective in reducing absorption of liquid water.

It has been proposed to use wax-emulsions to impart water-repellency to such cellulosic materials as hardboard, fibre installation board etc. and also certain textiles. In many of these processes, the wax emulsions have been used at a concentration of the order of 5% and usually have required a subsequent heat-treatment to achieve the desired degree of water repellence. Moreover previously described wax-emulsions are unstable in the presence of various wood-preservative and fire-retardant salts and thus combined treatment has been unsatisfactory.

It is an object of the present invention to provide stable emulsion compositions comprising wax and one or more wood preservatives and/or fire retardants which are especially suitable for achieving water-repellency together with preservation and/or fire retardant properties in timber, hardboard and fibre-board.

According to the present invention we provide wood-treatment compositions comprising an aqueous emulsion of a hydrophobic wax comprising a non-ionic surface active agent containing one or more polyoxyethylene chains or a combination of such agents, said agent or combination of agents having an HLB No. between 12 and 22, together with one or more wood preservatives and/or fire retardants.

The compositions according to the invention have a wood preservative and/or fire retardant action and, owing to the wax emulsion, increase the water-repellency of the wood and hence help to maintain its dimensional stability when it is exposed to liquid water and weathering in extreme climates. The water-repellent effect also inhibits efflorescence and washing out of soluble fire-retardant salts.

We have found that by using the long chain ethylene oxide non-ionic surface active agents referred to above the emulsions remain stable in the presence of the preservative or fire retardant substances even at the relatively high concentrations of salts commonly required for the fire-retardant and wood-preservative compositions. In particular, they are able to withstand the high oxidation potential of the hexavalent chromium in the conventional chrome preservatives. Other wax emulsions we have tested in the presence of the conventional copper-chrome-arsenate wood-preservatives and ammonium salt fire-retardants have proved too unstable to be of practical use. The most preferred compositions according to the invention are stable, even though containing hexavalent chromium at pH 1.8 to 3.0, for at least twelve weeks.

The HLB (Hydrophilic Lipophilic Balance) No. of the surface active agent is preferably between 14 and 18. The HLB values for a wide variety of non-ionic surface active agents are described in the textbook "Physical Pharmacy" (E. W. Martin).

The emulsifying agent used may comprise a mixture of different emulsifying agents provided that the overall HLB of the mixture lies within the stated range.

The wax in the wax emulsions is preferably paraffin wax and we have found that while the high melting-point waxes give higher water-repellency, the lower melting point waxes impart greater stability to the emulsions. In general, we prefer the melting point of the wax to be within the range 40° to 50° C., preferably about 45° C.

We have also found that the stability of the emulsion in the compositions of the invention can be increased by using liquid or semi-solid paraffins in admixture with the solid wax, for example conventional liquid paraffin or petroleum jelly. The petroleum jelly, when used, preferably possesses a melting point in the range 38° to 56° C. (as measured according to British Standard Specification No. 894 of 1956), advantageously about 40° C., especially when used with a paraffin wax of melting point about 45° C.

The weight ratio of wax to liquid or semi-solid paraffin is advantageously between 45:55 and 70:30, preferably about 55:45.

The ethylene oxide condensates used as surface active agents in accordance with the invention are preferably long chain fatty alcohol condensates or alkyl phenol condensates, the condensed ethylene oxide chain advantageously containing at least 25 ethylene-oxide units. The hydroxylic moiety is preferably derived from a long chain fatty alcohol having 10 to 18 carbon atoms or an alkyl phenol having 7 to 11 carbon atoms in the alkyl group thereof, advantageously a nonyl phenol. Particularly useful commercial surface active agents include Lubrol W (30 ethylene oxide groups) (ICI), and Ethylan HP (25 ethylene oxide groups) and Ethylan HA (35 ethylene oxide groups) (Lankro chemicals). The compositions according to the invention are conveniently prepared by first producing an aqueous wax-emulsion concentrate containing the surface active agent or agents, the concentrate being added to an aqueous solution of the wood preservative and/or fire retardant compounds.

The concentration of paraffins in the emulsion concentrate, before incorporation into the compositions of the invention, is advantageously below 70% w./v., the higher concentrations being more convenient in practice, e.g. about 50%. The concentration of surface active agent in the wax emulsion concentrate is advantageously in the range 4–6% w./v., preferably about 5%.

The compositions according to the invention preferably contain 0.1 to 3.0% w./w. of wax, preferably 0.3 to 1.5% w./w. corresponding to a content of 0.2 to 6.0% w./w. of a 50% wax emulsion. Thus, since the wax emulsion concentrates advantageously contain from 4–6% w./v. of surface active agent, the concentration of surface active agent in the final woodtreatment composition according to the invention is preferably in the range 0.008 to 0.36% w./v. using for example a 50% wax emulsion. The relatively dilute wax emulsion compositions according to the invention are preferred because, under the pressure method of impregnating the wood, they allow the water-borne preservative or fire-retardant to penetrate well into the wood and yet, by a filtration effect, the wax particles or droplets are concentrated in the outer cell-structure of the wood to give a continuous protective layer.

The wood preservative components of the present compositions are preferably of the type containing one or more hexavalent chromium compounds at a pH in the range 1.8–8.0 together with salts of metals such as copper or zinc, e.g. as the sulphates and advantageously containing arsenates. Hexavalent chromium may for example be present as a water-soluble dichromate, e.g. potassium or sodium dichromate, or a water-soluble chromate e.g. sodium chromate, or as chromic acid. Copper or zinc may be present as the sulphates or arsenates. Commercially available compositions of this type include Tanalith C or CA, Boliden K.33 and Celcure A. The invention is also applicable to emulsions comprising wax and chrome-fluor-arsenate compositions (e.g. those based on sodium dichromate arsenic pentoxide, and sodium fluoride, such as Basilit UAS) and copper-chrome-borate compositions (such as Tanalith CBC). In general the wood preservative compositions according to the invention will contain from 1 to 10% by weight of wood preservative.

The fire retardant components are preferably ammonium phosphates and/or other ammonium salts, with or without borates. Commercially available products include, for example, Pyrolith, Minalith and Celcure F. They preferably constitute between 10 and 30% by weight of the total composition. Minalith, for example, has the composition:

| | Percent |
|---|---|
| Diammonium phosphate | 10 |
| Ammonium sulphate | 60 |
| Sodium tetraborate | 10 |
| Boric acid | 20 |

The compositions according to the invention produce particularly good results when used in pressure impregnation processes, e.g. in conventional systems such as the Full Cell, Lowry and Reuping Systems. Following such pressure impregnation a protection against water far in excess of expectation is frequently obtained. Apparently in such processes slow filtration of emulsion particles takes place in depth in the wood structure which effectively blocks capillaries between wood cells notably within the ray parenchyma.

In order that the invention may be well understood, we give the following examples by way of illustration only:

Example 1

Emulsions were prepared using paraffin wax of melting point 45° C. and petroleum jelly using the formulations illustrated in Table 1.

TABLE 1

| Emulsion | Percent | | | | |
|---|---|---|---|---|---|
| | A | B | C | D | E |
| Paraffin wax | 32.5 | 40 | 45 | 50 | 32.5 |
| Liquid paraffin | | | | | 32.5 |
| Petroleum jelly | 32.5 | 25 | 20 | | |
| Surface active agent* | 5 | 5 | 5 | 5 | 5 |
| Water | 30 | 30 | 30 | 45 | 30 |

*Lubrol W.—A long chain fatty alcohol ethylene oxide condensate with 30 ethylene oxide groups H.L.B. No. 14.9.

The stability of these emulsions and of 1% w./w. dispersion in 3% w./v. "Tanalith" C solution together with the water repellence of treated timber samples are given in Table 2. Tanalith C has the composition:

| | Percent |
|---|---|
| $K_2Cr_2O_7$ | 45.0 |
| $CuSO_4 \cdot 5H_2O$ | 35.0 |
| $As_2O_5 \cdot 2H_2O$ | 20.0 |

TABLE 2

| Emulsion | Stability of emulsion alone | Stability of 1% emulsion in 'Tanalith' C | Water repellency of treated timber, percent |
|---|---|---|---|
| A | Good | Stable more than 12 weeks. | 52 |
| B | do | do | 52 |
| C | do | Stable for 12 weeks | 54 |
| D | do | Stable for 5 weeks | 52 |
| E | do | Stable for 10 weeks | |

The method of testing for the water repellency of the treated wood was as follows:

The specimens are cut from straight-grain Scots Pine (*Pinus sylvestris*) sapwood and are ¼″ sections taken from a piece 1⅛″ x 1⅝″ in transverse cross-section, the growth rings running parallel to the 1⅝″ dimension. Five pairs of specimens are cut, each pair consisting of adjacent sections from the same piece. The samples are conditioned to an equilibrium moisture content of 12%. One specimen of each pair is placed in a beaker, the five specimens are weighted down and exposed to a vacuum of 26″ Hg for 15 mins. in a vacuum desiccator. The treatment solution is then allowed to flow through a tube leading into the beaker, after which the vacuum is released and the samples are allowed to soak for 30 minutes. The excess liquid is then drained off and the treated specimens are placed in suitable racks to allow free circulation of air until an equilibrium moisture content of 12% is attained. Each specimen is then submerged in water at 25° C. for 30 mins. and the swelling in the tangential direction is measured by means of a suitably modified micrometer to the nearest 0.001 inch. The percent water repellency of the treated specimen is then calculated from the following formula:

$$\text{percent water-repellency} = \frac{a-b}{a} \times 100$$

Where $a$=swelling of untreated specimen, and $b$=swelling of treated specimen.

Using this modified method in evaluating the effective water repellency of water-borne preservatives and/or fire retardants incorporating a wax emulsion system we regard a water repellency in excess of 50% to be satisfactory.

Example 2

Samples of Parana Pine (*Pinus araucaria angustifolia*) of transverse cross-section 1" x 2" and 4 in. in length were pressure treated with a 15% solution of "Pyrolith" incorporating 1% of a wax emulsion system having the following composition:

| | Percent |
|---|---|
| Paraffin wax M.P. 45° C. | 32.5 |
| Petroleum jelly | 32.5 |
| Lubrol W | 5.0 |
| Water | 30.0 |

"Pyrolith" has the following composition by weight:

| | Percent |
|---|---|
| Diammonium phosphate | 47.0 |
| Monoammonium phosphate | 47.0 |
| Arsenic pentoxide | 3.0 |
| Sodium fluoride | 3.0 |

The following treatment cycle was employed:

Vacuum—15 mins. at 26" Hg
Pressure—1 hour at 80 p.s.i.

An absorption of 1.92 gals./cu. ft. was obtained giving a net dry salt retention of 2.73 lb./cu. ft. and an average wax loading of 0.192 lb./cu. ft. which was largely concentrated in the outer cells of the timber by filtration during pressure treatment.

It was confirmed that as a result of this treatment, the timber had a water repellency of 62% and by standing the treated timber with the end-grain submerged in ½" water, it was confirmed that the efflorescence of the high loading of unfixed fire retardant salts was greatly reduced as compared with a matched sample treated under the same conditions with "Pyrolith" salts without the emulsion additive.

Example 3

Samples of Radiata Pine (*Pinus radiata*) 1" x 2" x 4" in dimension were pressure treated with a 3% solution of "Tanalith" C incorporating 1% wax emulsion system having the following composition:

| | Percent |
|---|---|
| Paraffin wax 45° C. | 45 |
| Petroleum jelly | 20 |
| Lubrol W | 5 |
| Water | 30 |

The following treatment cycle was employed:

Vacuum—15 mins. at 26" Hg
Pressure—1 hour at 80 p.s.i.

An absorption of 3.7 gals./cu. ft. was obtained giving a net dry salt retention of 1.11 lb./cu. ft. and an average wax loading of 0.192 lb./cu. ft. It was confirmed that as a result of this treatment the timber had a water repellency of 53%.

Example 4

Emulsions were formulated exactly as described in example except that in place of Lubrol W the following surface active agent combinations were used:

(a) Texafor A90+Pluronic L81 in the ratio of 4:1 by weight Overall H.L.B. No.=16.4
(b) Ethomid HT/60+Ethofat 60/2 in the ratio of 1:1 by weight overall H.L.B. No.=15.8
(c) Lubrol W+Pluronic L81 in the ratio of 4:1 by weight Overall H.L.B. No.=12.5.

These emulsions exhibited good stability when mixed with a 3% solution of Tanalith C in a proportion of 1%.

Example 5

Matched samples of Beech (*Fagus sylvatica*) 12" x 4" x 1" were prepared and marked alternately A and B. The B samples were retained as controls and the A samples pressure treated with a 3% "Tanalith" CA solution containing 1% of a wax emulsion of the following composition:

| | Percent |
|---|---|
| Paraffin wax 45° C. | 35 |
| Petroleum jelly | 20 |
| Texafor A90 (HLB.18.8) | 4 |
| Pluronic L81 (HLB.2) | 1 |
| Water | 40 |

"Tanalith" CA has the following composition by weight:

| | Percent |
|---|---|
| $Na_2Cr_2O_7$ | 39.0 |
| $CuSO_4$ (anhydrous) | 22.4 |
| $As_2O_5 \cdot 2H_2O$ | 33.4 |
| $Na_2HAsO_4$ | 5.2 |

The following treatment cycle was employed:

Vacuum—30 mins. at 26" Hg
Pressure—2 hrs. at 150 lb./sq. in.

An absorption of 2.6 gals./cu. ft. was obtained, giving an average wax loading of 0.143 lb./cu. ft.

All samples were conditioned to 12% moisture content and attached to a weathering device arranged so that in a cycle of 6 hours, each sample experienced:

(a) a complete soaking from water jets;
(b) a partial drying from an air current;
(c) exposure to heat, giving a surface temperature of 75–90° C. by a radiant heater and reflector; and
(d) exposure to ultra-violet radiation.

After 20 days of such exposure, the samples were removed and examined for degradation. The treated A samples showed no degradation, while the untreated B samples showed excessive twisting, warping and splitting.

Example 6

Matched samples of Western Hemlock (*Tsuga heterophylla*) 12" x 4" x 1" were prepared and marked alternately A and B. The B samples were retained as controls and the A samples were treated with a 3% solution of "Tanalith" C incorporating 1% of a wax emulsion having the composition:

| | Percent |
|---|---|
| Paraffin wax 45° C. | 30 |
| Petroleum jelly | 30 |
| Ethomid HT/60 (HLB.17.6) | 2.5 |
| Ethofat 60/25 (HLB.14.1) | 2.5 |
| Water | 35 |

The following treatment cycle was employed:

Vacuum—30 mins. at 26" Hg
Pressure—2 hours at 200 lb./sq. in.

An absorption of 2.4 gals./cu. ft. was obtained, giving an average wax loading of 0.144 lb./cu. ft.

All samples were conditioned to 12% moisture content and exposed on the weathering device described in Example 5. After 20 days exposure the samples were removed and examined for degradation. The treated A samples showed no degradation, while the untreated B samples showed extensive checking and splitting.

Example 7

Two samples of Redwood (*Pinus sylvestris*) ¾" x 6" x 6" were prepared from one piece ¾" x 6" x 12" and marked A and B. The B sample was used as a control sample, and the A sample was pressure treated with a 3% solution of the preservation composition described below containing 1% of a wax emulsion of the composition:

| | Percent |
|---|---|
| Paraffin wax 45° C. | 55 |
| Lubrol W. (HLB.14.9) | 5 |
| Water | 40 |

Composition by weight of preservative:

| | Percent |
|---|---|
| $Na_2Cr_2O_7$ | 40.0 |
| $Na_2HAsO_4$ | 29.3 |
| $NaHF_2$ | 22.0 |
| $NaF$ | 8.7 |

The following treatment cycle was employed:

Vacuum—30 mins. at 26″ Hg
Pressure—2 hrs. at 150 lb./sq. in.

An absorption of 3.4 gal./cu.ft. was obtained, giving an average wax loading of 0.186 lb./cu. ft.

Both samples were conditioned to 12% moisture content, after which they were sprayed with water for 1 hour. The untreated B sample absorbed 3.7 times more water than the treated A sample.

Example 8

Two samples of Parana pine (*Araucaria angustifolia*) ¾″ x 6″ x 6″ were prepared from one piece ¾″ x 6″ x 12″.

These were marked A and B; sample B was used as an untreated control and sample A was pressure treated with a 3% solution of the wood preservative solution described below containing 1% of a wax emulsion of composition:

| | Percent |
|---|---|
| Paraffin wax 45° C. | 27.5 |
| Petroleum jelly | 27.5 |
| Lubrol W. (HLB.14.9) | 4 |
| Pluronic L.81 (HLB.2) | 1 |
| Water | 40 |

Composition by weight of the preservative:

| | Percent |
|---|---|
| $CrO_3$ | 26.6 |
| $CuO$ | 14.8 |
| $As_2O_5.2H_2O$ | 34.0 |
| Water | 24.6 |

The following treatment cycle was employed:

Vacuum—30 mins. at 26″ Hg
Pressure—2 hours at 150 lb./sq. in.

An absorption of 3.2 gal./cu. ft. was obtained, giving an average wax loading of 0.181 lb./cu. ft.

A standard drop of water of 0.04 ml. was applied to the surface of both samples. On sample A the drop height fell 28% in 30 mins. calculated from travelling microscope measurements. On sample B the drop was absorbed completely by the timber in 4 mins.

We claim:

1. A wood treating composition comprising an aqueous emulsion containing from 0.1 to 3.0% w./v. of a hydrophobic wax; at least 0.008% w./v. of a nonionic surface active agent having at least one condensed ethylene oxide chain containing at least 25 ethylene oxide units and a Hydrophilic Lipophilic Balance number between 12 and 22, said surface active agent being a condensate of at least one member selected from the group consisting of a long chain fatty alcohol of 10 to 18 carbon atoms and an alkyl phenol of 7 to 11 carbon atoms in the alkyl radical; and from 1.0 to 10% by weight of a water-soluble wood preservative containing hexavalent chromium.

2. A composition as claimed in claim 1 in which the Hydrophilic Lipophilic Balance number is between 14 and 18.

3. A composition as claimed in claim 1 in which the wax is paraffin wax.

4. A composition as claimed in claim 1 in which the melting point of the wax is within the range of 40° to 50° C.

5. A composition is claimed in claim 1 containing a member selected from the group consisting of a liquid paraffin and a semi-solid paraffin in admixture with said wax, the weight ratio of wax to said member being between 45:55 to 70:30.

6. A composition as claimed in claim 5 in which the paraffin is petroleum jelly having a melting point of 38° to 56° C., measured according to British Standard Specification No. 894 of 1956.

7. A composition as claimed in claim 1 in which the concentration of the surface active agent is 0.008 to 0.36% w./v.

8. A composition as claimed in claim 1 in which the wood preservative is a member selected from the group consisting of a chrome-copper-arsenate, chrome-zinc-arsenate, chrome-fluor-arsenate and a chrome-copper-borate preservative.

9. A method of treating wood to preserve it and impart water repellency comprising applying to the wood the composition of claim 1.

10. A method as claimed in claim 9 which is carried out under superatmospheric pressure.

References Cited

UNITED STATES PATENTS

| 2,381,487 | 8/1945 | Cook et al. | 106—15 |
| 2,424,831 | 7/1947 | Klaber | 106—15 |
| 2,452,054 | 10/1948 | Jones et al. | 106—15 |
| 2,635,055 | 4/1953 | Figdor | 106—15 |
| 3,063,852 | 11/1962 | Daudin et al. | 106—15 |
| 3,083,138 | 3/1963 | Schulz | 167—38.5 |

JULIUS FROME, *Primary Examiner.*

L. HAYES, *Assistant Examiner.*

U.S. Cl. X.R.

117—149, 150; 160—271; 167—38.6; 252—311.5